(12) United States Patent
Siciliano et al.

(10) Patent No.: US 7,225,087 B1
(45) Date of Patent: May 29, 2007

(54) METHOD AND APPARATUS FOR DETECTING UNINTENTIONAL ISLANDING OF UTILITY GRID

(75) Inventors: Robert Siciliano, Boonton, NJ (US); James M. Daley, Wharton, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

(21) Appl. No.: 10/880,805

(22) Filed: Jun. 29, 2004

Related U.S. Application Data

(60) Provisional application No. 60/485,854, filed on Jul. 9, 2003.

(51) Int. Cl.
*H02H 7/122* (2006.01)
(52) U.S. Cl. .................................................. 702/58
(58) Field of Classification Search ............... 702/58, 702/63, 106, 107, 183, 191, 190
See application file for complete search history.

(56) References Cited

U.S. PATENT DOCUMENTS

| | | | |
|---|---|---|---|
| 5,493,485 A * | 2/1996 | Okado | 363/56.01 |
| 5,686,766 A | 11/1997 | Tamechika | |
| 6,219,623 B1 | 4/2001 | Wills | |
| 6,304,468 B2 | 10/2001 | Ichinose et al. | |
| 6,429,546 B1 | 8/2002 | Ropp et al. | |
| 6,603,290 B2 | 8/2003 | Hochgraf | |
| 2001/0005321 A1 | 6/2001 | Ichinose et al. | |
| 2001/0056330 A1 | 12/2001 | Wills | |
| 2002/0060556 A1 | 5/2002 | Wall | |
| 2003/0080741 A1 | 5/2003 | LeRow et al. | |
| 2003/0147191 A1 | 8/2003 | Deng et al. | |
| 2003/0165036 A1 | 9/2003 | Tuladhar | |
| 2004/0021470 A1 | 2/2004 | Adams et al. | |

FOREIGN PATENT DOCUMENTS

EP  1 278 282  *  1/2003

OTHER PUBLICATIONS http://www.m-w.com/dictionary/synchronous, p. 1.*
http://www.m-w.com/dictionary/frequency, p. 1.*
http://www.m-w.com/dictionary/dwell, p. 1.*

* cited by examiner

*Primary Examiner*—Bryan Bui
*Assistant Examiner*—Tung S. Lau
(74) *Attorney, Agent, or Firm*—McDonnell Boehnen Hulbert & Berghoff LLP

(57) ABSTRACT

Method and system for identifying an islanding event in a utility grid. Method includes generating a user defined control signal and applying the user defined control signal to a distributed resource interconnected to the utility grid. The user defined control signal is used to alter at least one operating parameter. In one arrangement, the user definable unintentional islanding control signal includes a first signal defining a first peak disturbance and a second signal defining a second peak disturbance. The user definable unintentional islanding control signal is used to alter at least one operating parameter of said distributed resource.

28 Claims, 8 Drawing Sheets

METHOD AND APPARATUS FOR DETECTING UNINTENTIONAL ISLANDING OF UTILITY GRID

CROSS REFERENCE TO RELATED APPLICATIONS

This application claims priority under 35 U.S.C. Section 119 (e) from a provisional patent application Ser. No. 60/485,854 filed Jul. 9, 2003, which is herein entirely incorporated by reference and to which the reader is directed for further information.

BACKGROUND OF THE INVENTION

The present invention generally relates to utility grid interconnected electrical power systems and, in particular, systems, methods, and techniques to detect and/or prevent unintentional islanding of such systems.

DESCRIPTION OF RELATED ART

Distributed generation is generally known as an application of a remotely distributed electric power resource that generates power onto a utility electric power system. The benefits of distributed generation relate to power continuity, power reliability, and economic gain. The power output capacity of a distributed resource, operating in such a distributed generation system, is generally less than the power output capacity of the electric power system. As such, the utility electric power system can generally be considered an infinite source. Therefore, when-interconnected to a distributed resource, the electric power system tends to act as a reference source for both voltage and frequency. As such, a distributed resource does not typically influence either of these operating parameters (system voltage and/or frequency) under normal operating conditions. However, as explained below, such may not be the case where the distributed resource remains part of a section of the electric power system experiencing an unintentional islanding condition.

Owners of distributed resource assets seeking to apply these types of assets towards distributed generation usually must acquire prior approval from a local utility. This approval process can be extensive and can also vary amongst various different geographic locations. Invariably, however, the approval process generally seeks at least one common goal and that goal relates to ensuring that safe and adequate interconnection controls are in place along the utility power grid. While the electric utility is primarily interested in electric power grid protection, a distributed resource owner is like-wise interested in protecting the investment in the distributed resource itself.

A distributed generation system includes (but may not necessarily be limited to) various interconnection devices, a distributed resource, distributed resource protective relays, electric power system protective relays, and a distributed generation control system. Typically, a distributed generation control system controls the interconnection devices and also controls the distributed resource for utility grid synchronization and/or power output.

Islanding occurs when a portion of the electric power system remains energized by a source outside of a serving utility. Intentional islanding is a pre-planned occurrence and typically has no negative consequences. Unintentional islanding is an unplanned event and presents a number concerns. For example, unintentional islanding can present a dangerous situation for those utility operators and/or maintenance operators working on the utility electric power system that mistakenly assume the section of the grid is de-energized since the serving utility is no longer providing power to it. In addition, severe damage to the distributed resource can occur if the unintended island is reconnected to the energized electric power system (i.e.: utility power is restored) without appropriate precautions. Also, customer loads may be susceptible to damage due to the inability of the distributed resource to maintain acceptable power quality in a zone of the unintentional island. In distributed generation systems, certain safeguards have been incorporated to detect and prevent islanding for the protection of those exposed to these risks, for the protection of the distributed resource, and for reliability of electric power delivered.

Unintentional islanding occurs when a distributed resource is interconnected with an electric power system, and an anomaly occurs on the electric power system. Such an anomaly (i.e.: weather- or accident-related power interruptions) can leave the distributed resource energizing portions of the electric power system. There are several methods whereby such an anomaly is typically detected. However, such detection methods have certain limitations.

For example, certain known devices and mathematical algorithms exist for the protection of the electric power system and are commonly referred to as protective relays, and have been assigned unique 'Device Numbers' by the American National Standards Institute ("ANSI").

Such devices can be standalone units, single- or multi-function units, or exist as mathematical equations as part of a distributed generation control system. Such devices, however, may be defined as passive in nature. That is, although these devices measure and initiate a response based upon user-defined parameters, these devices generally have no active influence on the electric power system or on the distributed resource. The typical application of a protective relay is to open a feeder breaker when a fault is detected. Depending upon the nature of the fault, one (or more) of the following electric power system protective functions could be used with distributed generation:

ANSI Device 27: Undervoltage relay

ANSI Device 32: Directional power relay

ANSI Device 37: Undercurrent or underpower relay

ANSI Device 46: Reverse-phase, or phase-balance, current relay

ANSI Device 47: Phase sequence voltage relay

ANSI Device 59: Overvoltage relay

ANSI Device 67: AC Directional overcurrent relay

ANSI Device 81: Frequency relay

Although the above list presents several devices to detect faults and separate interconnected sources, these devices are dependent upon the fault characteristics exceeding the trip threshold of the protective function(s). Application of the previously listed protective functions will not be entirely effective in preventing unintentional islanding due to the variable nature of anomalies that do not result in a measurable fault or cause system parameters to exceed protective relay trip thresholds. An additional concern relates to a potential for overcompensating the protection by applying narrow protective relay operating levels (trip/reset thresholds). Such overcompensation tends to disrupt the distributed generation control system and produce undesirable nuisance trips.

There is, therefore, a general need for a method of detecting an unintentional islanding condition that utilizes an electric power system protective relay(s) along with an influence of the distributed generation control system. In the scenario of an unintentional islanding condition, the initial loss of utility power does not trigger separation via the protective relay. The distributed generation control system therefore remains unaware that an electric power system is not interconnected. Such a situation could occur because voltage and frequency within the protective relay trip threshold remain present in the unintended island even though only the distributed resource is providing the power. As a result of the utility power being taken off line, several different unintentional islanding situations or scenarios arise based in part on various loading and power factor issues. As described below, based in part on the type of scenario faced by a distributed resource, various anti-islanding scenarios can arise and therefore different anti-islanding detection mechanisms may be used.

In a first unintentional islanding scenario, a distributed resource operating at a load control setting becomes responsible for carrying the entire load of the facility and unintended island, whose combined value exceeds the aforementioned control setting. Thus, the distributed resource becomes overloaded. This overloaded distributed resource causes a reduction in bus frequency and/or bus voltage. The distributed resource could then be separated from the bus via the underfrequency and/or undervoltage protective devices.

In a second unintentional islanding scenario, the load of the unintended island is less than the load control setting of a distributed resource. This creates an under-loaded condition for the distributed resource. Without an infinite source (infinite bus) to work against and absorb the additional power generated by the distributed resource, the bus frequency and/or voltage would typically rise. This increasing frequency and/or voltage would tend to allow the sources to be separated via the overfrequency and/or overvoltage protective devices.

In a third unintentional islanding scenario, the unintended island load matches the load control setting of the distributed resource but the power factor of the unintended island is higher than the power factor control setting of the distributed resource. Where the distributed resource comprises a rotating synchronous machine (e.g., a gas turbine), this creates an over-excited condition for the distributed resource: a voltage regulator has raised a stator magnetic field excitation to produce a level of reactive power output greater than the load reactance. Without an infinite bus to work against, the distributed generation operating voltage would tend to rise, thereby allowing the distributed resources to be separated via the overvoltage protective device.

In a fourth unintentional islanding scenario, the unintended island load matches the load control setting of the distributed resource but the power factor of the unintended island is lower than the power factor control setting of the distributed resource. Such a scenario creates an under-excited condition for the distributed resource. Without an infinite bus to work against, the distributed generation operating voltage would decrease, allowing the sources to be separated via the electric power system undervoltage protective device.

A fifth unintentional islanding scenario can occur where the real power and power factor of the unintended island matches the real power and power factor control settings of the distributed resource. This fifth unintentional islanding scenario is difficult to detect in an acceptable timeframe with a typical passive detection means as identified above. In this fifth unintentional islanding scenario, the loss of utility power coupled with the distributed resource control system operating conditions does not cause a change to electrical parameters (i.e., voltage, frequency, real power, or power factor) which cross protective relay trip thresholds. Therefore, neither the passive protective functions alone, nor the passive protective functions in tandem with the distributed generation control system, detect this type of islanding condition. There is, therefore, a need for a more sophisticated means of detecting such an unintentional islanding scenario.

One known method for detecting such an unintentional island condition requires the implementation of an active control technique. One active control technique, "frequency-shift," is one known method that can be used to expose such an unintentional island condition. One known frequency-shift method relies on a general belief that the smaller power capacity of the distributed resource (when compared to the utility) renders the distributed resource incapable of influencing bus voltage or frequency once interconnected to the utility. Here, a distributed generation control system's connection to a synchronous distributed resource (such as a governor of a turbine) influences output frequency when the distributed resource is isolated from the electric power system, but changes to influence real power output when interconnected with the electric power system. Therefore, the presence or absence of an electric power system may be detected by this distinction. The systems and methods disclosed in U.S. Pat. Nos. 6,429,546 and 6,219,623, hereby entirely incorporated by reference and to which the reader is directed for further details, generally disclose certain aspects of such frequency-shift techniques.

However, frequency-shift techniques have certain limitations. For example, certain frequency shift techniques utilize unintentional islanding control signals that are derived from feedback. By relying on such feedback, these unintentional islanding control signals have limited, if any, user-definition. This can be problematic in that the control signal response time, that is, the time to shift the frequency beyond the protective relay trip threshold, becomes variable. Such system variability may cause certain other problems as well. For example, having a variability in response times may cause complications when an operator attempts to coordinate a system's protective relays.

Another limitation relates to the technology comprising the distributed resource. The prime mover of a distributed resource can be one of a number of technologies (i.e.: steam or combustion turbine, hydraulic turbine, internal or external combustion engine, etc.) Each of these has specific mechanical properties relating to inertia, torque, etc. As such, their dynamic response varies greatly.

In addition, certain frequency-shift techniques do not sufficiently address the impact of the technology in the scenario of unintentional (nuisance activation) or continuous use. For example, continuous application of frequency-shift to a non-islanded distributed resource often has the resultant affect of producing power control instability. The same applies when the method is not in continuous use, but is nonetheless similarly activated (unintentionally) by a triggering event that does not precede the formation of an unintentional island. Such power control instability can have deleterious affects on the distributed resource. Additionally, the stability and dynamic response characteristics of the distributed generation control system may also be compromised.

There is, therefore, a general need for a method and system that provides a flexible, user-defined unintentional islanding control signal and activation scheme. There is also a general need for a method and/or system that utilizes an unintentional islanding control signal and that does not rely on feedback to determine characteristics of the control signal. Such a method and/or system also enables a system operator to tailor or customize certain characteristics of an unintentional islanding control signal to take into account various operating dynamics of the overall generation system. For example, there is a general need for a method and/or system that allows a system operator to tailor or customize certain characteristics of an unintentional islanding control signal such as response time to reach and/or exceed the protective relay trip threshold. Here, the system provides the operator with a level of sequential predictability in the system's response to an unintentional island.

There is also a general need for a method and/or system that allows for tailoring or customizing certain characteristics of an unintentional islanding control signal such as the rate of change of the frequency shift. Here, the operator can assess the potential for nuisance activation of the protection relays. Additionally, the operator can assess the level of resultant power control instability for the cases of unintentional activation or continuous use. The operator also has the benefit of evaluating and coordinating the dynamic response of the distributed generation control system for the cases of unintentional activation or continuous use.

There is also a general need for a control signal that can be modified or tuned for a variety of distributed resources possessing varying response characteristics. A system with a fixed frequency-shift algorithm (not user-definable) may work satisfactorily on one given distributed resource, yet be unstable or otherwise undesirable on another due to differences in their respective transfer functions (ratio of the Laplace transform of the system output to that of the system input).

BRIEF SUMMARY

In one exemplary embodiment, a method for identifying an islanding event in a utility grid includes the steps of generating a user defined control signal and applying the user defined control signal to a distributed resource. The distributed resource is interconnected to the utility grid. The user defined control signal is utilized to alter at least one operating parameter of the distributed resource.

In an alternative arrangement, a system for identifying a distributed resource islanding event in a utility grid includes a distributed resource at a synchronous state coupled to the utility grid. A user defined control signal is applied to the distributed resource. The control signal is used to alter at least one operating parameter of the distributed resource.

In an alternative arrangement, a user definable unintentional islanding control signal includes a first ramp signal defining a first peak disturbance and a second ramp signal defining a second peak disturbance. The user definable unintentional islanding control signal is used to alter at least one operating parameter of the distributed resource.

DESCRIPTION OF THE FIGURES

The present invention will be more fully understood from the accompanying figures depicting key aspects of the invention and its function. The accompanying figures should not be taken to limit the invention to the specific embodiments shown, but rather for explanation and better understanding of the invention and its potential applications.

DETAILED DESCRIPTION

Figure 1:
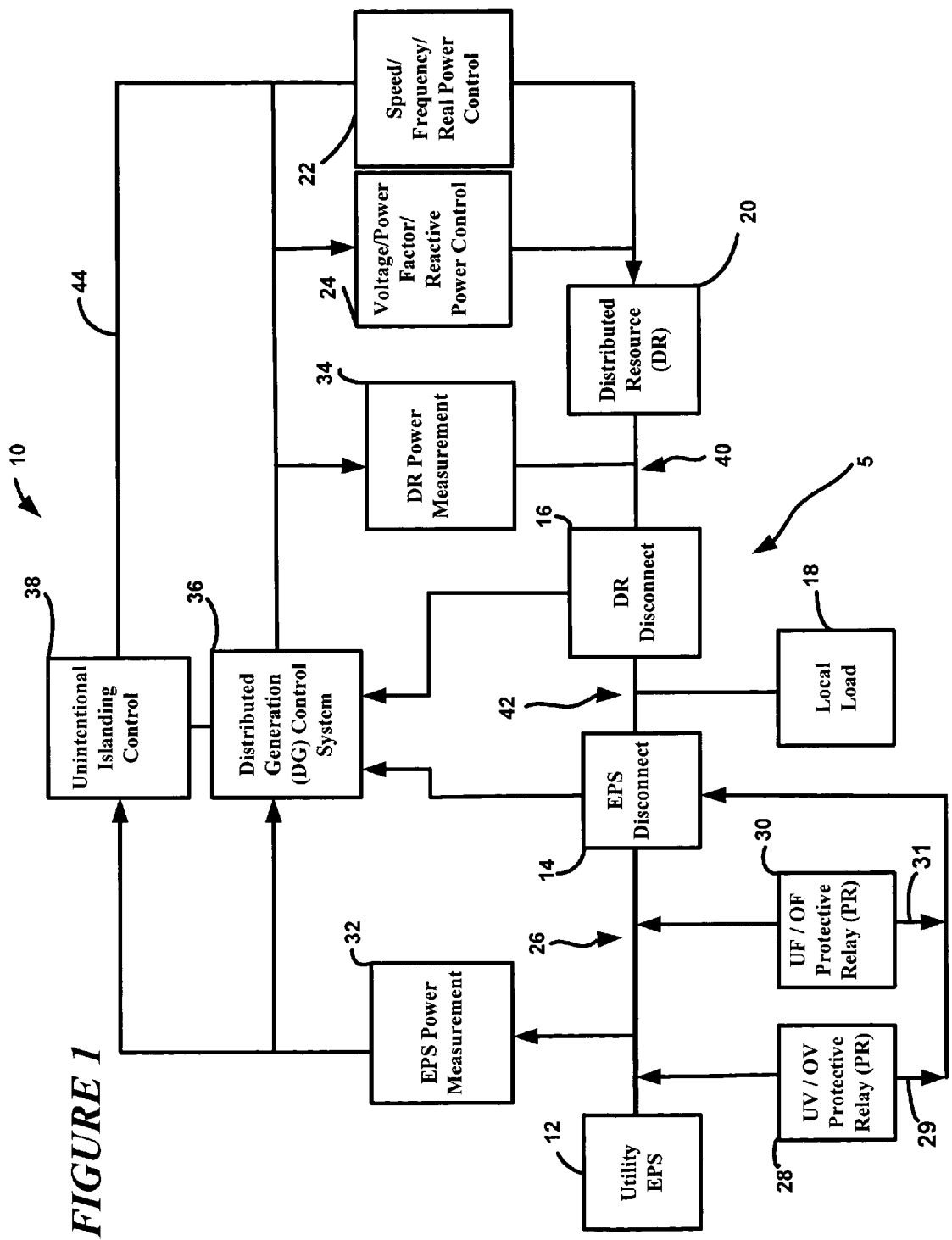
FIG. 1 illustrates a block diagram of a distributed generation control system incorporating aspects of the present invention.

FIG. 1 is a simplified block diagram of a distributed generation control system 10 incorporating aspects of the present invention. Distributed generation control system 10 comprises a utility electric power system or utility EPS block 12, EPS power measurement 32, electric power system disconnect or "EPS disconnect" device 14, local load 18, distributed resource ("DR") disconnect 16, distributed resource ("DR") power measurement 34, and a distributed resource ("DR") 20. These various elements are coupled along a main bus structure 5.

Utility electric power system ("Utility EPS") 12 represents a node for utility supplied electric power. Utility EPS 12 is coupled to electric power system disconnect or "EPS disconnect" device 14. EPS disconnect 14 is a mechanism typically utilized for opening and/or closing a circuit to utility EPS 12. EPS disconnect 14 is coupled to distributed resource disconnect 16 and local load 18. DR disconnect 16 is a mechanism utilized for opening or closing a circuit to distributed resource (DR) 20. Local load 18 represents a device or alternatively a plurality of devices that require electric power for operation. DR 20 represents an alternate power generation source. For example, such an alternate power generation source could comprise photovoltaics, fuel cells, wind turbines, water turbines, gas turbines, diesel generators, gas generators, or a plurality of the prior listed items.

One characteristic that is generally required of DR 20 is that the speed, frequency, and real power of DR 20 be controlled, and preferably, that these operating parameters be controlled remotely. As explained below, the speed, frequency, and real power of DR 20 may be influenced by way of a user defined unintentional islanding control signal ("UICS").

In the arrangement provided in FIG. 1, control of DR 20 can be accomplished in part by speed/frequency/real power control 22 and in part by voltage/power factor/reactive power control 24. Although voltage, power factor and reactive power control 24 is not applicable to all types of alternate power generation sources, it is common and desirable for rotating synchronous alternate power generation sources. Thus, rotating synchronous generation sources used for distributed generation may be preferred in applications requiring power factor/reactive power control.

Utility EPS 12, EPS disconnect 14, DR disconnect 16, and DR 20 are arranged along principal bus 5. Principal bus 5 comprises various bus segments including bus portions 26, 42, and 40. Power flow along bus segment 26 may be in either direction based upon system control. Since power can flow both into and out of utility EPS 12, utility EPS 12 acts as both a power sink as well as a power source. By power sink, it is generally meant that power flows into utility EPS 12. However, DR 20 should act as a power source only, since power flow into DR 20 may cause damage to the DR 20.

Typically, local load 18 acts as a power sink. Alternatively, local load 18 may at times be a power source such as a regenerative load type, such as, for example, an elevator. In one arrangement, DR 20 is operated to provide power flow into local load 18 from both Utility EPS 12 and DR 20. This power flow may occur simultaneously from both sources. However, in an unintentional islanding scenario where utility EPS 12 is not providing power flow, DR 20 is required to supply generally all of power demanded by local load 18.

Undervoltage and overvoltage protective relay ("OV/UV protective relay") 28 and underfrequency/overfrequency protective relay ("OF/UF protective relay") 30 monitor bus portion 26 and reside between utility EPS 12 and EPS disconnect 14. Protective relays 28 and 30 provide trip signals 29 and 31, respectively, to EPS disconnect 14. Trip signals 29 and 31 operate to open EPS disconnect 14 when protective relays 28 and 30, respectively, detect a fault(s). That is, protective relay 28 provides trip signal 29 when an undervoltage or an overvoltage situation is detected along bus portion 26. Similarly, protective relay 30 will provide a trip signal 31 when an underfrequency or an overfrequency is detected along bus portion 26. As explained below, protective relays 28 and 30 will have varying response times. In one arrangement of control system 10, a user defined UICS can take into account these varying response times in achieving a desired response to identifying and eliminating an unintentional islanding situation as may be called for by way of regulation, electrical codes, system design criteria, overall system specifications, and/or device limitations.

FIG. 1 illustrates one possible protective relay arrangement. As those of skill in the art will recognize, alternative protective relay schemes may also be implemented. For example, additional UV/OV or UF/OF protective relays, featuring different response characteristics, can be added to trip the EPS disconnect 14. Likewise, additional unique ANSI devices for power system protection may be added to trip the EPS disconnect 14. Contemporaneous protective relays may also be applied to trip the DR disconnect 16 based upon measurements along bus segment 40. In one alternative arrangement, protective relays 28 and 30 (and others which trip EPS disconnect 14) are completely replaced by similar functions which act upon DR disconnect 16. In yet another alternative arrangement, a protection scheme may utilize algorithms and/or control signals emanating from the distributed generation control system 36 ("DG control system") and not as independent devices. Provided a fundamental means of source separation exists, the location and application of the protection may be tailored as required by the system architect and/or serving utility guidelines.

Electric power system power measurement ("EPS power measurement") 32 is coupled to bus portion 26 and between utility EPS 12 and EPS disconnect 14. EPS power measurement 32 monitors various power parameters of bus portion 26. EPS power measurement 32 also provides measured power data such as Volts, Amps, Frequency, kW, kVAR, phase rotation, phase angle, etc. to DG control system 36. EPS power measurement 32 may be a standalone device or part of DG control system 36.

Based in part on the data output from EPS power measurement 32, DG control system 36 coordinates control of DR 20, EPS disconnect 14, and DR disconnect 16 for the execution of distributed generation. DG control system 36 is coupled to EPS disconnect 14 as well as to DR disconnect 16 such that DG control system 36 may provide open/close control. DG control system 36 also provides for position monitoring. That is, DG control system 10 can monitor whether the various disconnects are engaged and which DRs are interconnected or not interconnected.

DG control system 36 receives input from distributed resource power measurement ("DR power measurement") 34. DR power measurement 34 measures the various power parameters of bus portion 40 residing between DR 20 and DR disconnect 16. DG control system 36 also is coupled to speed/frequency/real power control 22 as well as to voltage/power factor/reactive power control 24.

Unintentional islanding control 38 receives frequency data from EPS power measurement 32 and also receives disconnect position data from DG control system 36. That is, unintentional islanding control 38 can monitor whether certain disconnects have been energized preferably based on position data. That is, whether the disconnects are in an open or in a closed state. Based in part on this data, unintentional islanding control 38 generates the unintentional islanding control signal ("UICS") 44. In one preferred arrangement, UICS 44 is sent to speed/frequency/real power control 22 to control a speed, frequency, and/or real power operating characteristic of DR 20.

Under certain normal operating conditions, DG control system 36 preferably executes the following sequence when initiated. Under certain normal operating conditions, it may be assumed that the EPS disconnect has been energized and is therefore in a closed position.

Initially, DG control system 36 signals DR 20 to activate. DG control system 36 monitors DR 20 via DR power measurement 34 such that the DG control system 36 controls the output voltage, frequency, and phase of DR 20 to synchronize with an output voltage, frequency, and phase angle of the voltage generated by utility EPS 12. In one arrangement, synchronization has been defined as a voltage differential within 5% ($\Delta V \leftarrow 65\%$), a frequency differential within 0.2 Hz ($\Delta F \leftarrow 60.2$ Hz), and an electrical phase angle within 5 degrees ($\Delta \phi \leftarrow 658$).

Once the voltage, frequency, and phase angle of DR 20 becomes synchronized with utility EPS 12, DG control system 36 signals DR disconnect 16 to close. Closure of DR disconnect 16 results in the two sources (i.e., utility EPS 12 and DR 20) becoming interconnected and providing power in a synchronized manner along main bus 5. Using power data from EPS power measurement 32 and DR power measurement 34 to provide feedback to DG control system 36, DG control system 36 controls DR 20 to operate at a desired power output settings.

Unintentional islanding control 38 is added to the previously defined operating scenario to expose the formation of an unintentional island during certain periods of interconnection. In one preferred arrangement, unintentional islanding control 38 generates an unintentional islanding control signal or "UICS" 44 that has the ability to alter the stability of speed/frequency/real power control 22 of DR 20.

Two scenarios may arise by using such a disturbance causing speed/frequency/real power control signal. First, if an islanding situation does not exists, UICS 44 will not cause the frequency of DR 20 (or the system) to trend or move towards a trip threshold since bus 5 operates as an infinite bus with utility EPS interconnected, thereby maintaining frequency control.

Alternatively, if an islanding situation does exists, UICS 44 will disturb the frequency of DR 20 to trend or move towards a trip threshold: either towards an upper trip threshold or towards a lower trip threshold. Preferably, UICS 44 causes the frequency of DR 20 to trend or move towards a trip threshold of one of the under- or overfrequency protective relays 30. This would lead protective relay 30 to send a trip signal 31 to EPS disconnect 14 opening up disconnect 14, thereby terminating the islanding situation. One advantage of UICS 44 is that various aspects of the UICS may be user-defined and/or customized so that the amount of time it takes to terminate the islanding situation can be quantified. The user-defined UICS also enables a system operation to take into account certain system operating parameters such as various system delays and/or system configurations.

One preferred function of unintentional islanding control 38 is to allow a user to tailor or customize certain characteristics of UICS 44. In such a manner, a potential disturbance or instability that UICS 44 may present for speed/frequency/real power control 22 does not significantly affect the performance of DG control system 36 under continuous use and/or under unintentional activation scenarios. An unintentional activation relates to a power system anomaly, such as a frequency transient, which could portend or resemble an islanding precursor, but in fact an unintentional island does not exist.

As those of ordinary skill in the art will recognize, alternative arrangements of distributed generation control system 10 illustrated in FIG. 1 may vary from the diagram shown. Alternative arrangements and implementations of the items identified may vary from true physical assemblies to mathematical algorithms. For example, in one alternative arrangement, undervoltage protective relay 28 may comprise a standalone electronic device. Alternatively, undervoltage protective relay 28 may comprise a software routine of another component in the distributed generation control system 10. In yet another alternate arrangement, a system architecture could comprise one disconnect device as opposed to two disconnect devices.

Figure 2:
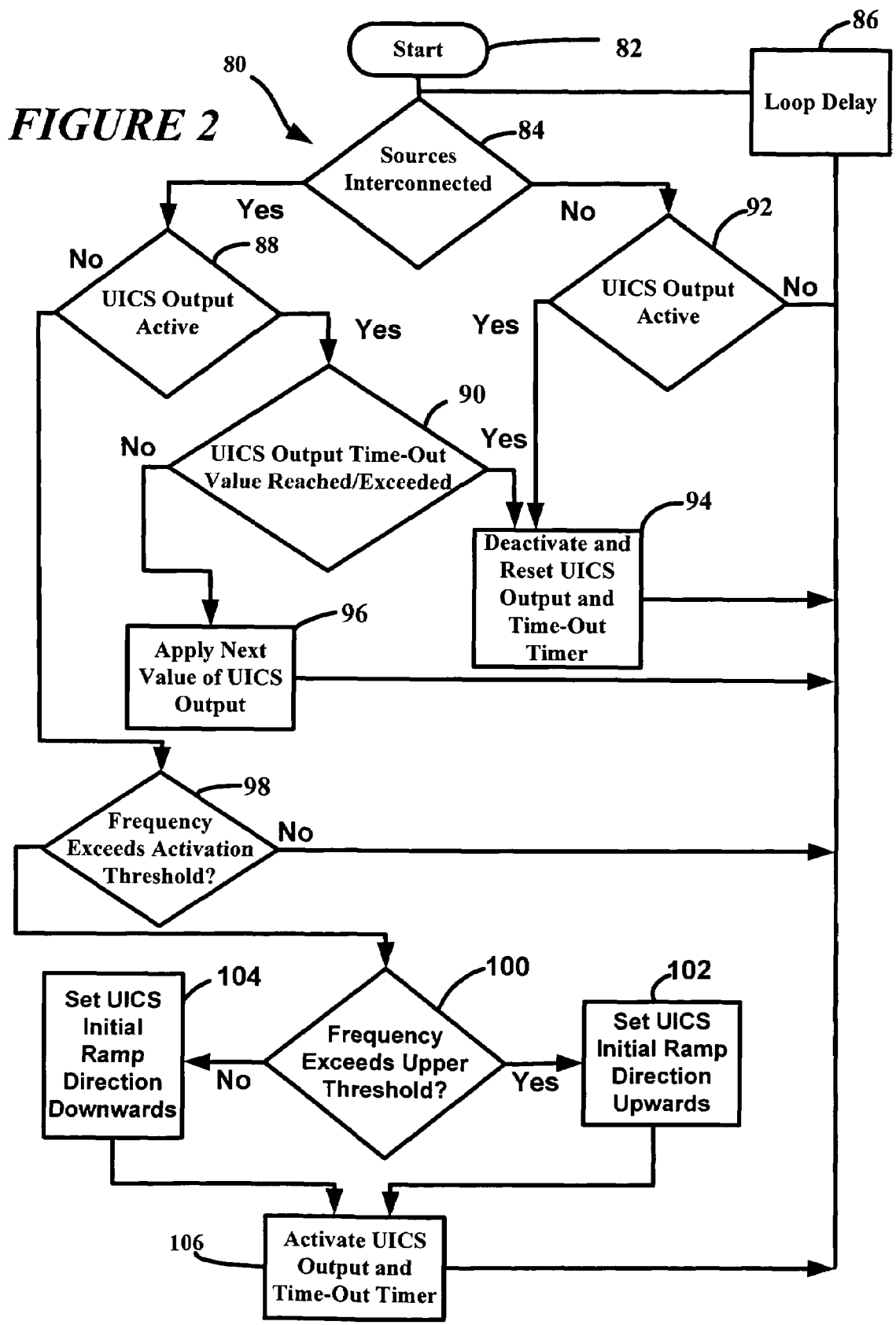
FIG. 2 illustrates a logic flow diagram incorporating aspects of the distributed generation control system illustrated in FIG. 1.

FIG. 2 illustrates a flow chart 80 describing aspects of the unintentional islanding control 38 illustrated in FIG. 1. Flow chart 80 may exist as a software routine, firmware routine, as the product of analog and/or digital electronic circuits, or may exist as some combination thereof.

Flow chart 80 begins with a first entry point Step 82 that leads to an initial determination Step 84. Step 84 determines whether power sources are interconnected. For example, returning to FIG. 1, Step 84 of flow chart 80 determines whether utility EPS 12 and/or distributed resource 20 are interconnected to the power grid. The inquiry at Step 84 also receives an input from a loop delay 86. Step 84 provides a starting point within process 80 for determining a status of unintentional islanding control, such as the unintentional islanding control 38 illustrated in FIG. 1. In this manner, Step 84 determines whether the unintentional islanding control starts, ends, or continues to operate.

If at Step 84, the process 80 determines that the sources are not interconnected, the process moves to Step 92. The process moves to Step 92 since, if the sources are determined not to be interconnected, there can be no unintentional island and therefore there will be no need for a UICS in this unconnected state. At Step 92, an inquiry is made as to whether the UICS output is active. That is, whether the system has been activated to sense an anti-islanding state. For example, the UICS may have been previously activated (with good cause), forced the sensing of an unintentional island, and ultimately led to the separation of the sources. Here, the UICS has performed its intended task and the logic must proceed to deactivate the UICS.

If the UICS has not been activated, the process returns to loop delay 86. If, however, it is determined at Step 92 that the UICS control has indeed been activated, the process proceeds to Step 94. At Step 94, the system deactivates the UICS, resets the UICS output, and resets a time-out timer. Step 94 may occur where the sources are not interconnected because the UICS was previously activated and the UICS was used to determine an islanding situation. In such a scenario, the UICS will now be deactivated. After Step 94, the process then returns to loop delay 86. In one arrangement, the loop delay 86 may comprise approximately 50 milli-seconds. Those of ordinary skill in the art will recognize, however, that other loop delay times may be used based in part on system design criteria, overall system specifications, and/or device limitations.

Returning to Step 84, if the sources are determined to be interconnected, the process proceeds to Step 88. At Step 88, an inquiry is made as to whether the UICS output has been activated. If at Step 88 the system determines that the UICS has been activated, method 80 proceeds to Step 90. At Step 90, an inquiry is made as to whether the UICS output time-out value has been reached. At Step 90, it may also be determined whether a time out value has been exceeded. If the output time-out has been reached or exceeded, the process proceeds to Step 94.

Alternatively, if the UICS output time-out value has not been reached or the time-out value has not been exceeded, the process proceeds to Step 96. At Step 96, the system applies a next value of the UICS output and then returns to the loop delay at Step 86. For example, if the UICS output comprises a multi-pulsed voltage (e.g., see UICS 170 illustrated in FIG. 5), a next voltage step will be applied based on a user defined profile.

Returning to Step 88, if the UICS output has not been activated, the process proceeds to Step 98. At Step 98, it is determined whether the system frequency exceeds an activation threshold, preferably a user defined activation threshold. By reaching Step 98, it may be concluded that unintentional islanding control output has not been activated. Therefore, a test for activation may be required. If the system frequency exceeds an activation threshold, either an upper activation threshold or a lower activation threshold, the process proceeds to Step 100. Alternatively, if the system frequency does not exceed an activation threshold, the process returns to loop delay 86.

At Step 100, an inquiry is made to determine whether the system frequency exceeds an upper activation threshold. If the system frequency exceeds an upper activation threshold, the process proceeds to Step 102. At Step 102, an initial ramp direction of the UICS is set in an upward direction. If, however, the system frequency does not exceed an upper activation threshold, it is assumed that the system frequency exceeds a lower activation threshold and an initial ramp direction of the UICS is set in the downward direction at Step 104. After the process sets the direction of the UICS ramp at Steps 102 or 104, the process continues to Step 106. At Step 106, the UICS output becomes activated and a user defined time-out timer becomes activated. Such time-out timer can be set by a system operator to establish a duration in which the UICS is activated.

After the UICS output and time-out timer have been activated at Step 106, the process proceeds to loop delay Step 86, which essentially resumes the logic tree after some delay time. Loop delay 86 sets a repetitive periodicity of process 80 and also provides a role in determining a characteristic of the UICS.

Figure 3:
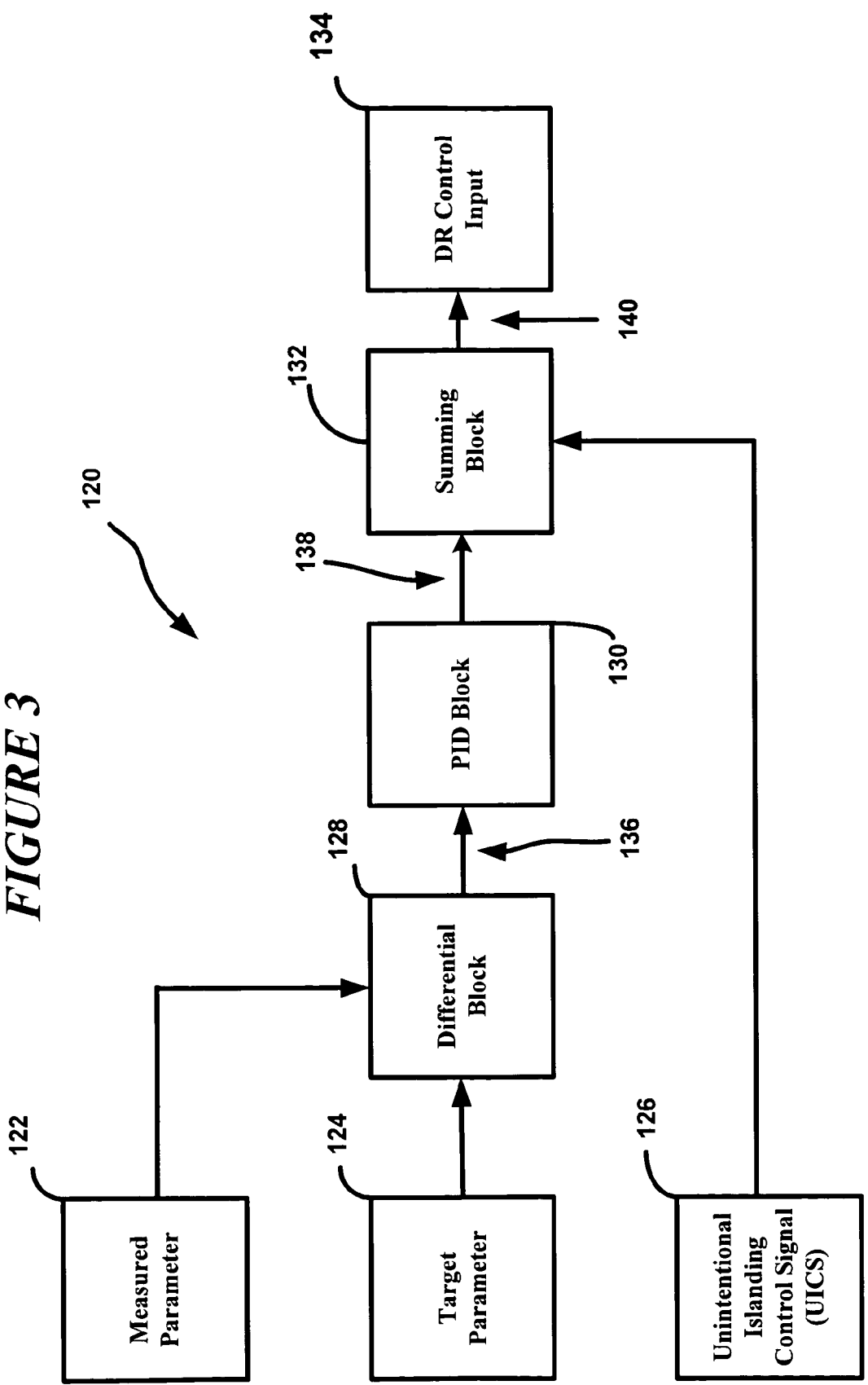
FIG. 3 is a block diagram illustrating one arrangement for generating an unintentional islanding control signal in relation to a distributed generation control system feedback loop.

FIG. 3 provides an illustration of a distributed generation control scheme according to one aspect of the present invention. Distributed control scheme 120 includes a measured parameter 122, a target parameter 124, an unintentional islanding control signal ("UICS") 126, a differential block 128, a PID block 130, a summing block 132, and a DR Control input 134.

FIG. 3 illustrates the UICS location in the distributed generation control system 120. In this arrangement, the DG control loop is represented as a PID controller. FIG. 3 is associated with FIG. 1 such that UICS 126 is the same as UICS 44, DR Control input 134 is the input to speed/frequency/real power control 22, while measured parameter 122, a target parameter 124, differential block 128, PID block 130, a summing block 132, and DR Control input 134 are elements of DG control system 36. FIG. 3 is associated with FIG. 2 such that the logic described by flowchart 80 produces the output represented by UICS 126.

Differential block 128 measures the difference between measured parameter 122 and target parameter 124. In one arrangement, measured parameter 122 and target parameter 124 of distributed generation control system 120 are values of real power (kW) since distributed generation control system 120 can function as a power controller during interconnect. Measured parameter 122 represents the present real power output of a distributed resource, such as the real power output of DR 20 illustrated in FIG. 1. Target parameter 124 represents a desired real power output of a distributed resource. The PID controller produces an output tending to result in the equivalence of measured parameter 122 and target parameter 124.

The output of differential block 128 may be referred to as an error signal 136. Error signal 136 represents the input to PID block 130. Preferably, PID block 130 contains circuits or algorithms for producing a proportional, integral, and/or derivative ("PID") output response to error signal 136. In a distributed generation control system without active unintentional islanding control, PID Block 130 output would tie directly to distributed resource control input 134. However, in one preferred arrangement, an intermediate summing block 132 is provided and this summing block 132 is used for the injection of UICS 126. More preferably, UICS 126 is the output produced from the logic of FIG. 2.

Summing block 132 produces an output 140 that represents a sum of UICS 126 and PID block 130 output 138. An output 140 of summing block 132 is tied directly to DR control input 134. This graphical representation illustrates how the UICS can be used to inject a user-desired instability to the PID control in the event of an unintentional islanding event.

This instability, however, applies to a condition where UICS 126 is active, but where an island does not exist. In such a case where an island does not exist, UICS 126 affects the real power output of the distributed resource because the distributed resource cannot influence the frequency of the electric power system when interconnected, due to the smaller capacity of the DR when compared to the utility (infinite bus).

Alternately, in the case where UICS 126 is active and an island does exist, the presence of UICS 126 has little to no effect on the real power output of the distributed resource. There is generally no effect on the real power output of the distributed resource since the distributed resource is no longer coupled to an infinite bus. In other words, and referring to FIG. 1, there is no effect on the real power output of distributed resource 20 since resource 20 is no longer coupled to an energized utility EPS 12. Consequently, the PID (kW) loop is not destabilized while the frequency output of the distributed resource 20 is intentionally altered.

One advantage of UICS is that its characteristics are user-definable. In a preferred embodiment, a UICS is activated when the distributed resource is interconnected with the electric power system, and a user-defined activation threshold has been exceeded. The activation threshold is defined as a deviation from a nominal system frequency. Once activated, the UICS acts as a disturbance signal into the distributed resource frequency/real power control input. The UICS characteristics can be pre-defined by a user such that the distributed resource is driven beyond the threshold of the frequency protective relays during unintentional islanding. Therefore, the UICS acts in concert with the protective relays to separate the sources and terminate the island.

Moreover, a UICS that is tailored such that system instability caused by the UICS's presence is only slightly detectable even when intentional islanding is not present: that is, in a non-islanding situation. This can be advantageous for the conditions whereby either the UICS is mistakenly activated by a system transient (not an unintentional island) or for the condition whereby the user desires the UICS to be continuously present (activation threshold equals zero).

Where a system transient (not an unintentional island) activates the UICS, the UICS can provide a user with a definable time-out value so that the system may ride-through the system transient. Such a time-out value may be used to cease the UICS and reset the driving circuit or logic. For example, a time-out value may be set to approximately 5 seconds. At some point a system frequency transient occurs of sufficient magnitude to exceed the activation threshold, thereby activating the UICS. Now, although an island does not exist, the UICS is active and destabilizing the PID (kW) loop, which may be undesirable. One benefit of such a time out value is that the UICS induced destabilization would have a finite duration (5 seconds for this example).

Figure 4:
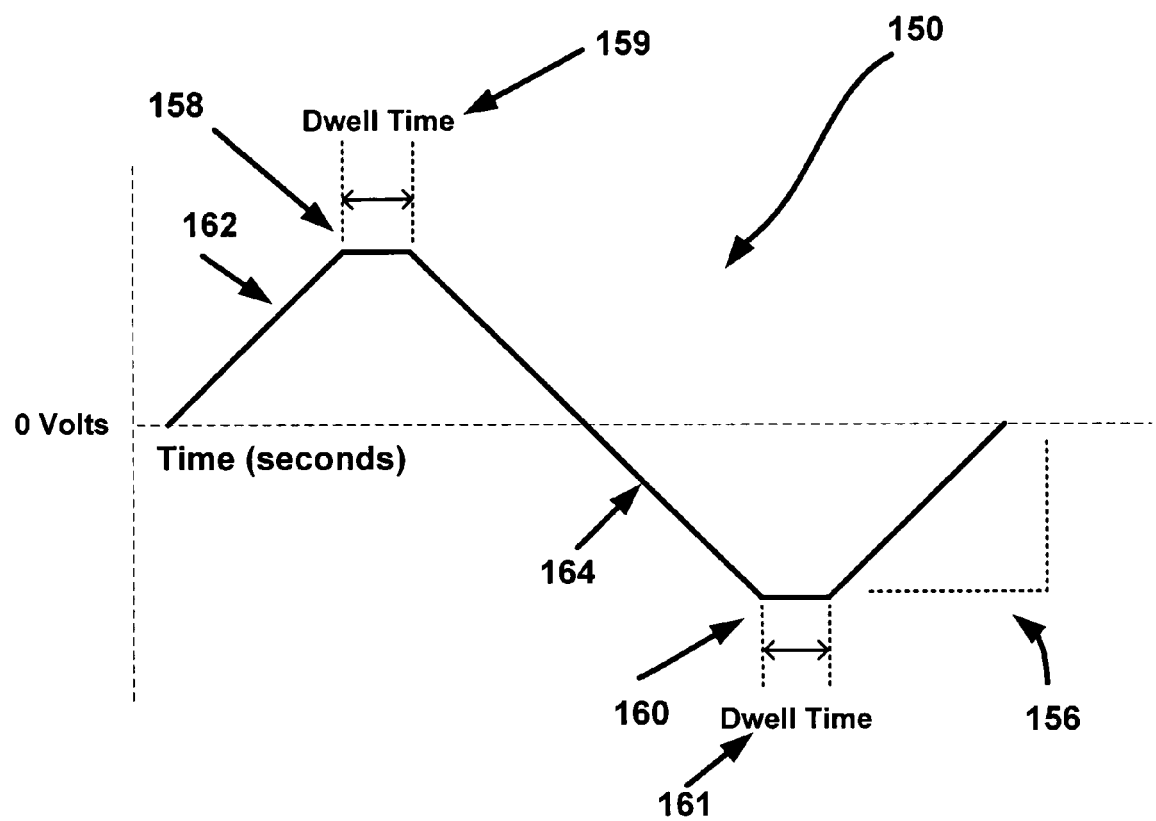
FIG. 4 illustrates a first arrangement of an unintentional islanding control signal.

FIG. 4 illustrates a first arrangement of an unintentional islanding control signal 150. As previously described, in one arrangement, a UICS can represent a voltage signal that is coupled to an input of a distributed resource, such as DR 20 illustrated in FIG. 1. The characteristics of UICS 150 can then be used to alter and/or control speed/frequency/real power of the distributed resource. In the arrangement illustrated in FIG. 4, UICS 150 represents a truncated bipolar triangle waveform. As explained previously with respect to Steps 102 and 104 from FIG. 2, in a preferred arrangement where an islanding situation is suspected, a UICS signal is initiated in a direction of a measured deviation (either in the positive or the negative direction) to affect the most rapid detection and separation of the interconnected sources.

Returning to FIG. 4, UICS 150 comprises a positive peak disturbance 158, a negative peak disturbance 160, and ramp rate 156. Peak disturbances 158, 160 set maximum and minimum values of the UICS, respectively. Ramp rate 156 sets a slope or a rate-of-change for UICS 150. For example, ramp rate 156 could be represented in terms of volts-per-second. Peak disturbances 158, 160 and ramp rate 154 may be user-defined and manipulated to influence the peak speed/frequency change of a distributed resource (e.g., distributed resource 20 in FIG. 1) and rate of that peak speed/frequency change to achieve a targeted result (e.g., time to exceed a protective relay trip threshold).

For example, assuming an owner and/or operator of DR 20 shown in FIG. 1 experiences an unintentional island: that is the utility EPS 12 becomes de-energized while the EPS disconnect 14 and the DR disconnect 16 remain closed. Under this unintentional island situation, an operator may desire to separate the DR 20 from an unintentional island and desires to separate the DR from the system in under 2 seconds. Further assume that the frequency protective relays 30 are set to trip when the measured frequency meets or exceeds a nominal frequency of 60 Hz by +/−0.5 Hz. In this situation, the peak disturbances 158, 160 and ramp rate 156 of UICS 150 must be set to affect a distributed resource frequency change of at least 0.5 Hertz in less than 2 seconds. Therefore, if 1.0 volts has been designed to correspond to a 0.5 Hertz frequency change in the distributed resource, the resulting UICS 150 would comprise a positive peak disturbance of +1.0 volts and a negative peak disturbance of −1.0 volts.

UICS 150 features truncated peaks to the triangular wave shape. The truncated peaks are coincident with peak disturbances 158, 160 and equate to an extended dwell time at the peak limits. Such truncated peaks may be included by design for an intentional dwell time at the peak limit(s). For example, peak disturbance 158 comprises a first dwell time 159 while peak disturbance 160 comprises a second dwell time 161. Preferably, dwell times 159, 161 are generally equivalent however, in some applications, they may differ. The purpose for such a characteristic is to grant an allowance for various system response delays, including delays in the distributed resource and protective relays. In the previous example, it would not serve a user to calibrate the system for the desired 0.5 Hertz frequency change, only to have the frequency change reverse course (along the triangular path) before the protective relay can act. Therefore, in one preferred arrangement, a UICS comprises a truncation that results in a dwell time further allowing the system operation to compensate for certain system delays.

In one preferred arrangement, application of UICS 150 would only require UICS 150 to output for one-quarter cycle of the wave. That is, applying UICS 150 either along a first positive ramp 162 or along a first negative ramp 164. In alternative arrangements, a UICS having a repetitive shape (e.g., sinusoidal) may be necessary for applications where continuous UICS operation is required. Such a repetitive shaped UICS may also be applied where a UICS was unnecessarily activated, for example, as in unintentional activation. Therefore, the bipolar periodic UICS waveform results in a real power (kW) oscillation (instability) when functioning while both the utility and distributed sources are interconnected. The previous example illustrated in FIG. 4 did not characterize the peak real power deflection caused by the UICS.

Figure 5:
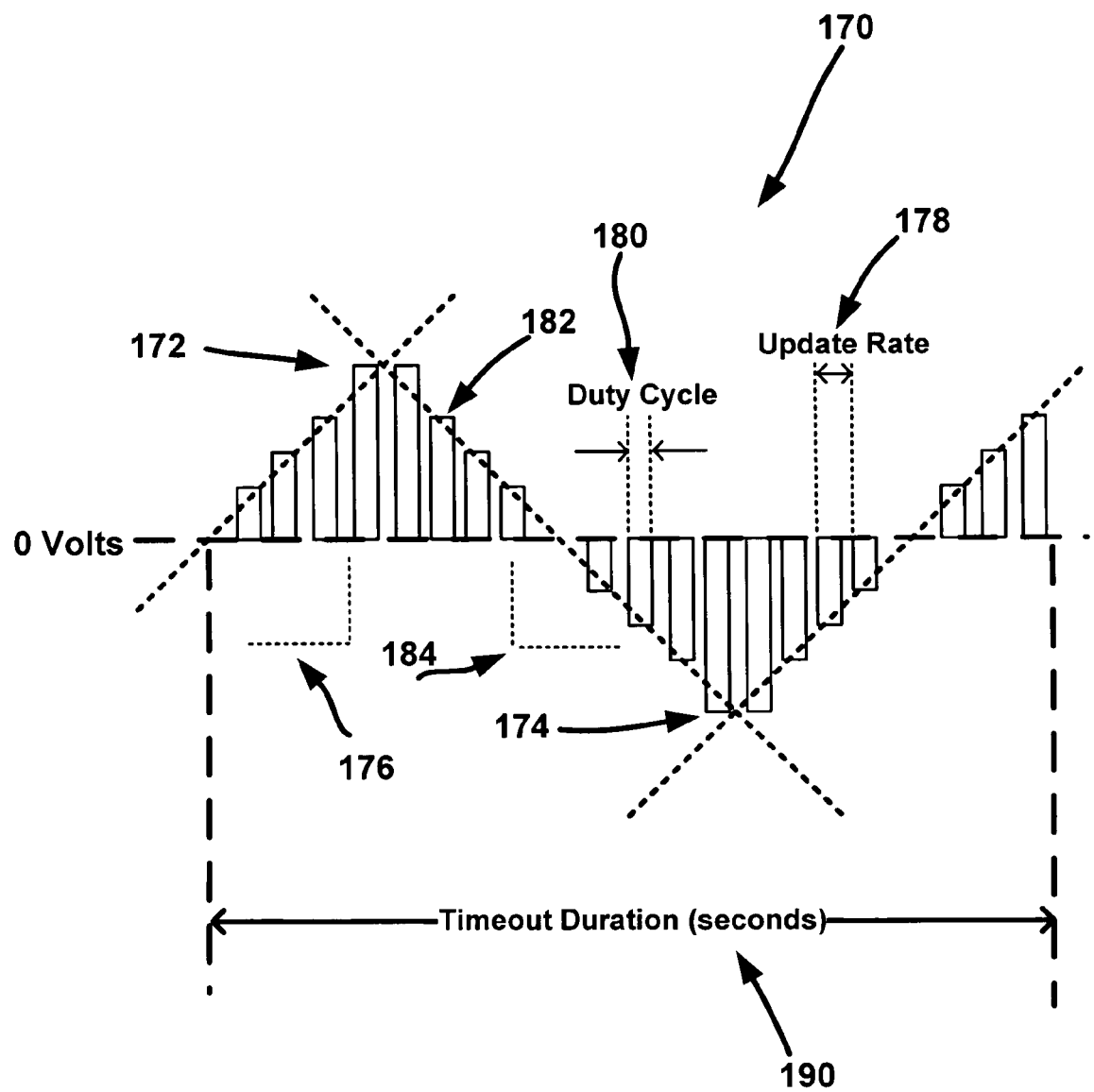
FIG. 5 illustrates another arrangement of an unintentional islanding control signal.

FIG. 5 illustrates yet another preferred arrangement of an unintentional islanding control signal 170. In this arrangement, UICS 170 comprises a plurality of discrete voltage pulses 182 each pulse having a predefined duty cycle (%) 180. UICS 170 further includes a number of other user definable characteristics. Such user definable characteristics include a positive peak disturbance (volts) 172, a negative peak disturbance (volts) 174, a positive ramp rate (volts/second) 176, a negative ramp rate (volts/second) 184, an update rate (seconds) 178, and a timeout duration (seconds) 190.

Positive peak disturbance 172 and negative peak disturbance 174, as described earlier, set an upper and a lower limit of the UICS output, respectively. These variables correspond to a maximum and a minimum speed/frequency deflection of an isolated/islanded distributed resource, or the maximum and minimum real power deflections of an interconnected distributed resource.

Positive ramp rate 176 and negative ramp rate 184, as generally described earlier, set a slope or a rate-of-change of UICS 170 in the positive and negative directions, respectively. Preferably, ramp rates 176, 184 set a slope or a rate-of-change of UICS 170 in terms of volts-per-second. Update rate 178 sets the amount of time in seconds between updates in the output value of the UICS. Duty cycle 180 sets a percentage of time that a UICS signal is active during an update interval. Timeout duration 190 defines an amount of time that the UICS signal 170 remains activated before UICS 170 resets itself.

Activation threshold, not illustrated in FIG. 5, preferably sets a value at which the UICS becomes activated. Activation threshold is a deviation from nominal system frequency and can be expressed in Hertz. As described in FIG. 2, activation threshold will have both an upper and a lower limit. For example, in a system that has a 60.00 Hertz nominal frequency, an activation threshold of 0.02 Hz will result in an upper activation threshold defined as 60.02 Hz and a lower activation threshold defined at 59.98 Hz. Therefore, a measured electric power system frequency exceeding the activation threshold while the sources are interconnected will cause a UICS output.

Figure 6:
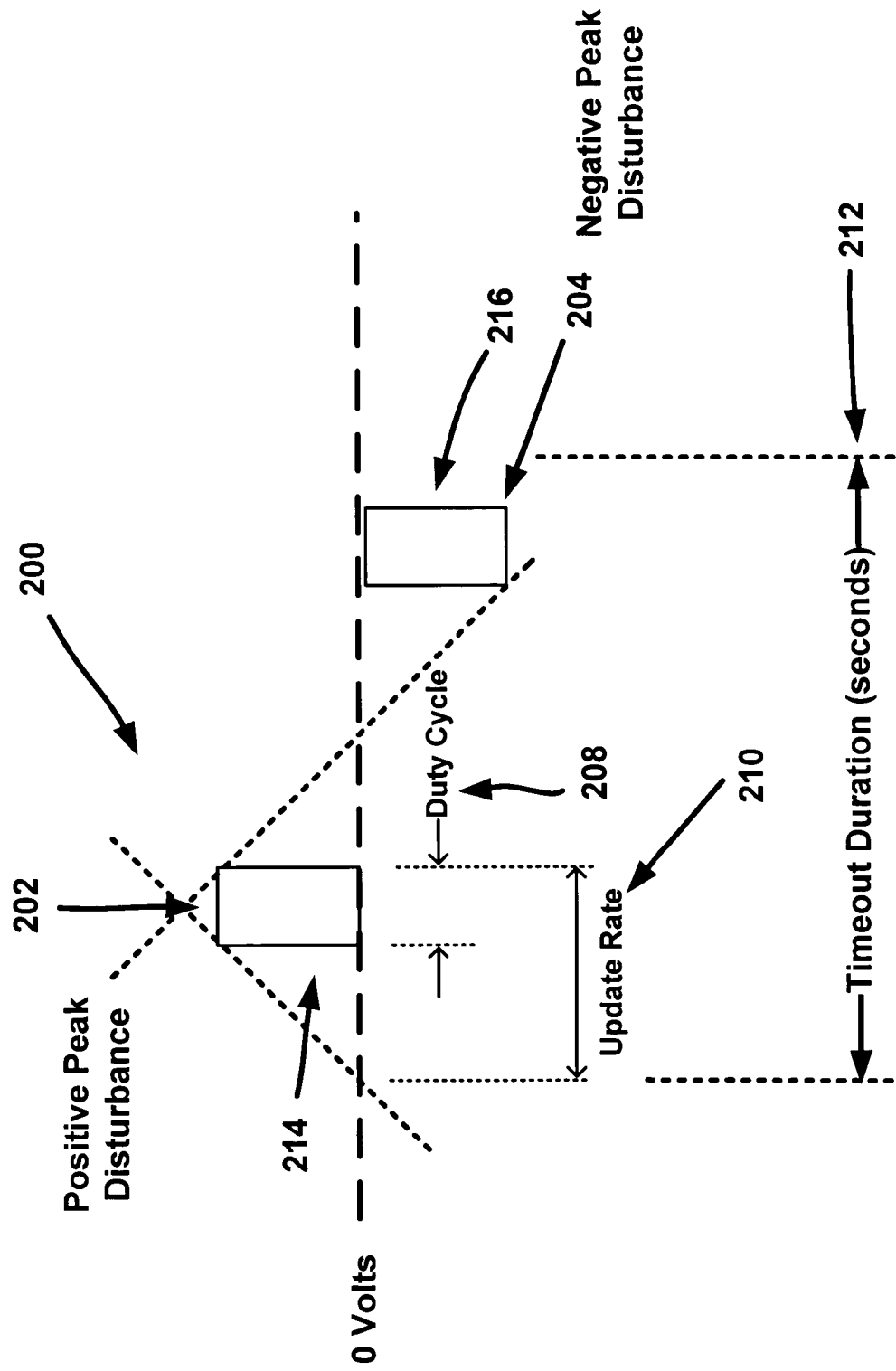
FIG. 6 illustrates another arrangement of an unintentional islanding control signal.

FIG. 6 illustrates yet another possible embodiment of an unintentional islanding control signal 200. UICS 200 comprises a first voltage pulse 214 and a second voltage pulse 216. First voltage pulse 214 defines a positive peak disturbance (volts) 202. Similarly, second voltage pulse 216 defines negative peak disturbance (volts) 204. UICS 200 further comprises a duty cycle (%) 208, an update rate (seconds) 210, and timeout duration (seconds) 212. These parameters of UICS 200 have been set such that the output cycle represents a single pulse of maximum duration in both the positive and negative direction. Therefore, in this arrangement UICS 200 comprises a ramp rate that equals peak disturbance (volts) 202 divided by update rate 210. In this arrangement, UICS 200 may be referred to as a discrete output waveform.

Figure 7:
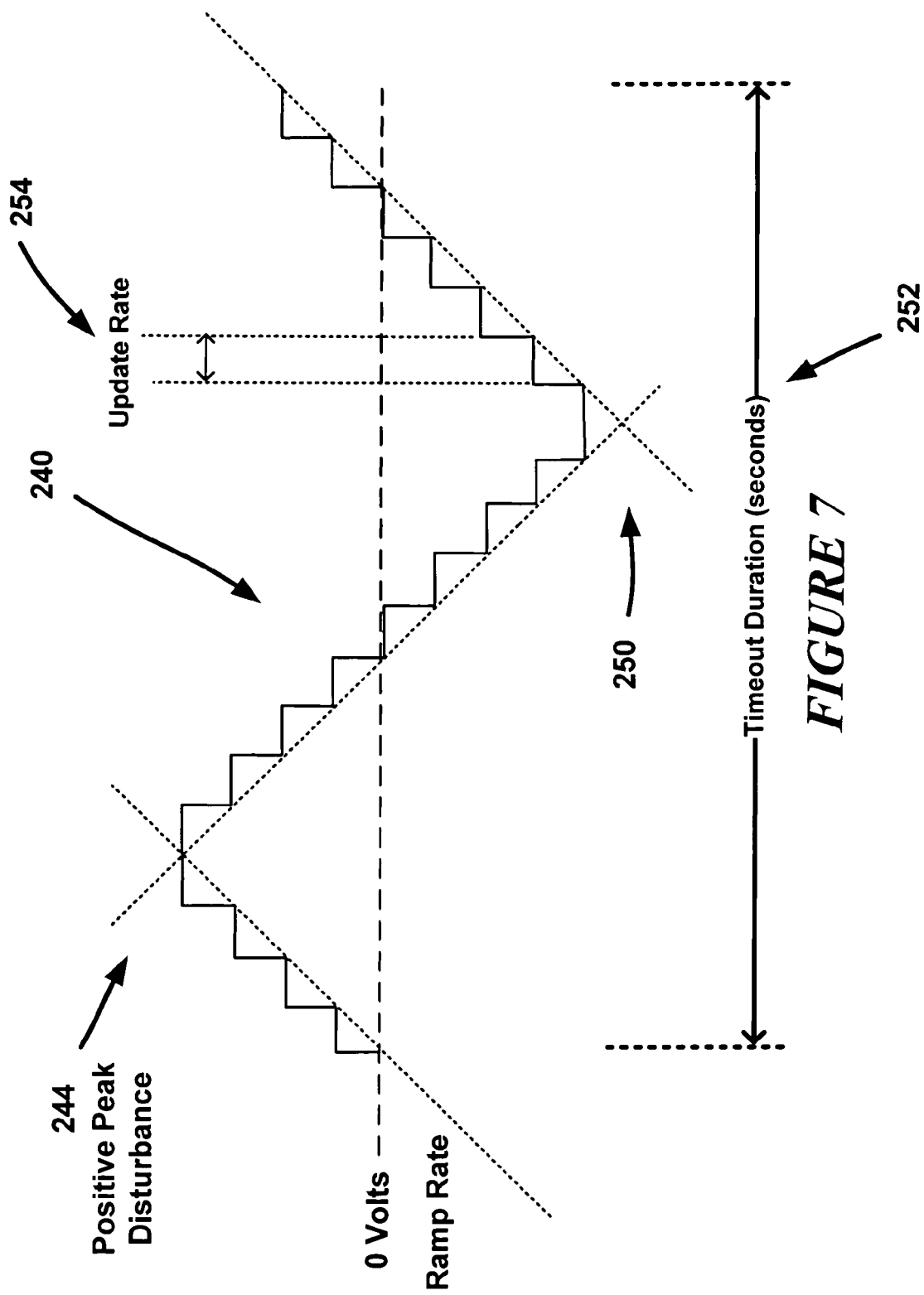
FIG. 7 illustrates another arrangement of an unintentional islanding control signal.

FIG. 7 illustrates an alternative arrangement of an unintentional islanding control signal 240. In this arrangement, UICS 240 comprises a staircase wave shape. UICS 240 comprises a positive peak disturbance (volts) 244 and negative peak disturbance (volts) 250 that set an upper and a lower limit of the UICS output, respectively. UICS 240 further comprises an update rate (seconds) 254, and timeout duration (seconds) 252. These parameters of UICS 200 have been set such that the wave shape of UICS 240 differs from the shape of UICS 170 of FIG. 5 in that the duty cycle of UICS 240 in FIG. 7 is 100%. Therefore, UICS 240 results in minimal "off time." Therefore, while FIG. 7 illustrates UICS 240 comprising an incremental (staircase) waveform, FIG. 5 illustrates a pulsed-incremental waveform.

Figure 8:
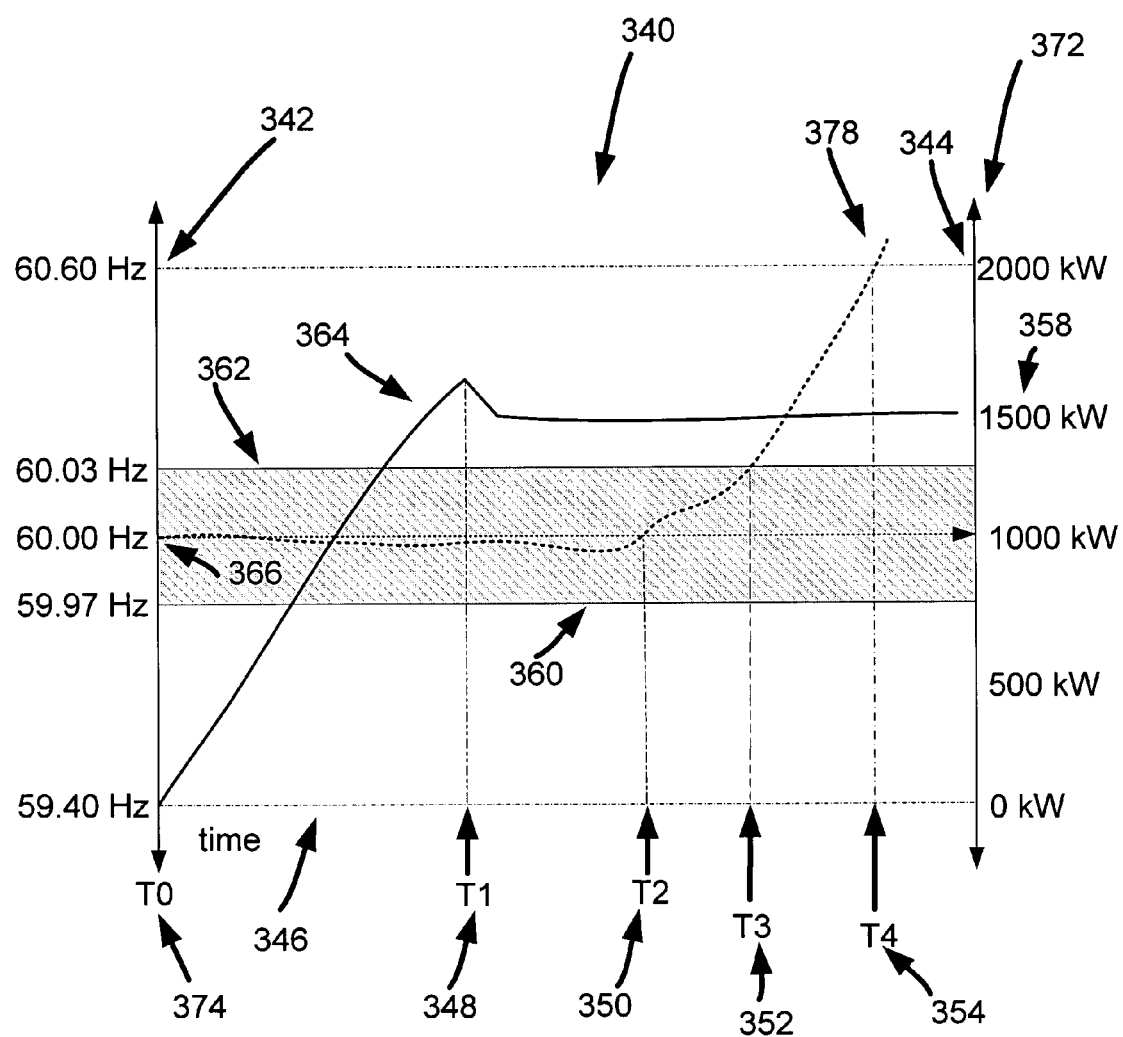
FIG. 8 illustrates an example of a system response during the formation of an unintentional island, utilizing aspects of the present invention.

FIG. 8 illustrates an example of a system response 340 during the formation of an unintentional island, utilizing aspects of the present invention. More specifically, FIG. 8 illustrates the combined frequency and power response 340 of a power generation system that experiences an unintentional island and includes aspects of the present invention. FIG. 8 represents a plot of frequency and real power versus time graph. Frequency (Hz) is provided along a left vertex 342 of graph 340 and real power (kW) is provided along a right hand vertex 372.

For purposes of illustration only, the following specifications may be used. However, as those of ordinary skill in the art will recognize, other limitations and specifications may also be used. FIG. 8 includes an over-frequency trip threshold (Hz) 344, an under-frequency trip threshold (Hz) 346, an upper activation threshold (Hz) 362, a lower activation threshold (Hz) 360, and a nominal frequency value (Hz) 366. The activation thresholds 362 and 360 may be defined by user-preference, regulations, electrical codes, system design criteria, overall system specifications, and/or device limitations. Activation thresholds 362 and 360 are evaluated in decision block 98 of FIG. 2. The over- and under-frequency trip thresholds 344 and 346 may be defined by user-preference, regulations, electrical codes, system design criteria, overall system specifications, and/or device limitations. Trip thresholds 344 and 346 represent the settings of the UF/OF protective relay 30 of FIG. 1.

In FIG. 8, the system comprises an electric power system having a nominal frequency 366 of 60.00 Hz. The system will also be set so as to have an activation threshold on the order of approximately 60.03 Hz. This activation threshold will therefore result in defining an upper activation threshold 362 of 60.03 Hz (i.e., nominal frequency plus activation threshold) and a lower activation threshold 360 of 59.97 Hz (i.e., nominal frequency less activation threshold). The system over-frequency trip threshold 344 will be set to 60.60 Hz while the under-frequency trip threshold 346 will be set to 59.40 Hz. The distributed generation control system steady-state target 358 is defined as approximately 1,500 kW.

Other specific parameter settings are not required except for the presumption that the peak disturbance has been set to drive frequency beyond the frequency protective relay trip thresholds.

In FIG. 8, a dashed trace 378 represents a frequency of the electric power system frequency, such as an operating frequency of utility EPS 12 illustrated in FIG. 1. Solid trace 364 represents a distributed resource real power (kW) output. The distributed resource kW is provided along the right hand vertex 372.

Time T0 374 represents a starting point whereby a synchronized distributed resource has been interconnected into the power grid. For example, in one arrangement and returning to FIG. 1, T0 374 could represent the point in time where Utility EPS 12 and DR 20 become synchronized after which DR 20 is then interconnected in distributed generation control system 10. During the time period from T0 374 to T1 348, the distributed generation control system increases loading on the distributed resource and this loading continues until achieving a steady-state loading, where in this case, the steady-state loading is approximately 1500 kW 358. Throughout the time interval from T0 374 to T1 348, minor frequency deviations may appear along dashed trace 378. These deviations represent frequency fluctuations which occur during normal utility EPS operation. It is generally expected that the EPS frequency of a majority of the power grid of the United States of America shall remain within 60.00 Hz 60.03 Hz during normal operating conditions. In this case, the minor frequency deviations shown between T0 374 to T1 348 do not activate a UICS since these fluctuations do not exceed either the upper or the lower activation thresholds.

From T1 348 to T2 350, the distributed generation control system achieves steady-state loading and is in stable control of real power (kW). Fluctuations in frequency trace 378 and the kW trace 364 are minor during this interval.

At time T2 350, a fault somewhere upstream from the electric power system disconnect occurs, thereby forming an unintentional island of the distributed resource.

In the example illustrated in FIG. 8, the system impedance change by the fault does not significantly affect the distributed resource or the distributed generation control system such that rapid detection by passive means occurs. Instead, the interval between T2 350 and T3 352 illustrates a slight frequency drift resulting from the system fault, or trigger event. At time T3 352, electric power system frequency trace 378 crosses upper activation threshold 362. Crossing the upper activation threshold 362 causes a UICS to activate. As explained above with respect to blocks 100, 102, and 104 in FIG. 2, since electric power system frequency 378 now exceeds upper activation threshold 362, UICS begins to initiate and is activated in an initial upward direction. As there is minimal kW fluctuation occurring during the T2 350 and T3 352 interval, the distributed generation control system does not currently recognize that an unintentional islanding situation exists even though UICS is currently activating.

From T3 352 to T4 354, electric power system frequency 378 is driven upward towards overfrequency trip threshold 344. During this same time period, the kW trace 364 remains essentially constant. The slope or ramp rate of the UICS will determine how quickly the frequency is driven towards and across the overfrequency trip threshold 344. For example, if the ramp rate 156 illustrated in UICS 150 of FIG. 4 were applied in the system for FIG. 8, the slope of frequency trace 378 between the time T3 352 and T4 354 would be generally characterized by the system transfer function.

At time T4 354, while the kW trace 364 remains essentially constant, electric power system frequency 378 crosses overfrequency trip threshold 344. This will trip a protective relay (such as protective relay 30 in FIG. 1, thereby tripping an EPS disconnect device (such as EPS disconnect 14 in FIG. 1). The island will therefore be terminated.

The essence behind this concept is to select values for the referenced parameters that allow the PID Controller to compensate for the disturbance while interconnected. Providing a variable update rate of the UICS is slower than the update rate of the PID controller, the PID controller can minimize the power oscillations caused by the presence of continuous UICS. For example, referring to the incremental waveform of FIG. 7, each plateau defined by the update rate is an opportunity for a PID controller to compensate, or cancel an effect of a disturbance generated by the unintentional islanding control signal.

Alternatively, the UICS's duty cycle may be used in conjunction with an update rate as in the pulsed incremental waveform of FIG. 5 to get improved PID compensation but avoid too coarse of an update rate. None of the aforementioned compensation occurs if the utility source is gone and an island is formed. In the case where an unintentional island exits, the invention works as designed, by driving frequency in one direction or the other to expeditiously, and in a controlled fashion, expose the island.

In view of the wide variety of embodiments to which the principles of the invention can be applied, it should be understood that the illustrated embodiment is exemplary only, and should not be taken as limiting the scope of the present invention. For example, one of ordinary skill in the art will readily appreciate that various elements of the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A method for identifying an islanding event in a utility grid, said method comprising the steps of:
   generating an analog user defined control signal;
   applying said user defined control signal to a distributed resource, said distributed resource interconnected to said utility grid while providing power flow into a load;
   utilizing said user defined control signal to incrementally alter at least one operating parameter, said at least one operating parameter being a speed, a frequency, or a real power control of said distributed resource and
   utilizing a protective mechanism to separate said distributed resource from said utility grid, thereby terminating said islanding event while said distributed resource continues to provide power flow to said load.

2. The invention of claim 1 wherein said step of utilizing said user defined control signal to alter said at least one operating parameter further includes the step of exposing said islanding event in said utility grid.

3. The invention of claim 1 further comprising the step of
   monitoring at least one parameter of said distributed resource to determine if said parameter exceeds a user-defined activation threshold; and
   applying said user-defined control signal to said distributed source if said parameter exceeds said user-defined activation threshold.

4. The invention of claim 3 further comprising the step of utilizing a protective mechanism to separate said distributed resource from said power grid if said control signal causes said monitored parameter to exceed said user-defined threshold.

5. The invention of claim 3 wherein said user-defined activation threshold comprises a frequency threshold.

6. The invention of claim 5 further comprising the step of determining if said frequency exceeds an upper activation threshold.

7. The invention of claim 5 further comprising the step of
   setting an initial ramp direction of said user defined control signal in a predefined direction if said frequency exceeds said upper activation threshold.

8. The invention of claim 5 further comprising the step of determining if said frequency exceeds a lower activation threshold.

9. The invention of claim 8 further comprising the step
   setting an initial ramp direction of said user defined control signal in a predefined direction if said frequency exceeds said lower activation threshold.

10. The invention of claim 1 where said distributed resource comprises a synchronous power source.

11. The invention of claim 10 wherein said synchronous power source comprises a generator.

12. The invention of claim 1 wherein said control signal comprises at least one incremental pulse.

13. The invention of claim 1 wherein said user defined control signal defines a duty cycle.

14. The invention of claim 1 wherein said user defined control signal defines an update rate.

15. The invention of claim 1 wherein said user defined control signal defines a ramp rate.

16. The invention of claim 1 wherein said user defined control signal defines a timeout duration.

17. The invention of claim 1 wherein said user defined control signal defines a peak disturbance value.

18. The invention of claim 17 wherein said peak disturbance value defines a dwell time.

19. The invention of claim 17 wherein said peak disturbance value comprises a positive peak disturbance value.

20. The invention of claim 17 wherein said peak disturbance value comprises a negative peak disturbance value.

21. A system for identifying a distributed resource islanding event in a utility grid, said apparatus comprising:
    a distributed resource at a synchronous state, said distributed resource coupled to said utility grid and providing power to a load; and
    an analog user defined control signal applied to said distributed resource,
    wherein said control signal is used to incrementally alter at least one operating parameter of said distributed resource, said at least one operating parameter being a speed, a frequency, or a real power control of said distributed resource, and
    a protective mechanism that separates said distributed resource from said utility grid, thereby terminating said islanding event while said distributed resource continues to provide power to said load.

22. An analog user definable unintentional islanding system control signal, said system control signal comprising:
    a first signal defining a first peak disturbance,
    a second signal defining a second peak disturbance,
    wherein said user definable unintentional islanding control signal is used to incrementally alter at least one operating parameter of a distributed resource, that provides power to a load, said at least one operating parameter being a speed, a frequency, or a real power control of said distributed resource, and
    a protective mechanism that separates said distributed resource from said utility grid, thereby terminating said islanding event while said distributed resource continues to provide power to said load.

23. The invention of claim 22 further comprising
    a timeout duration, said timeout duration terminating the output of said control signal upon said timeout duration expiration.

24. The invention of claim 22 wherein said first signal defines a first ramp rate.

25. The invention of claim 22 wherein said second signal defines a second ramp rate.

26. The invention of claim 22 where said first peak disturbance defines a first dwell time.

27. The invention of claim 22 where said second peak disturbance defines a second dwell time.

28. The invention of claim 22 further comprising an update rate,
    said update rate defining an amount of time between a first application of said control signal and a second application of said control signal for altering at least one operating parameter of said distributed resource.

* * * * *